(12) United States Patent
Dannhauser et al.

(10) Patent No.: US 10,858,530 B2
(45) Date of Patent: Dec. 8, 2020

(54) INKJET RECEIVING MEDIA

(71) Applicant: Eastman Kodak Company, Rochester, NY (US)

(72) Inventors: Thomas Joseph Dannhauser, Pittsford, NY (US); Mark Edward Irving, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 127 days.

(21) Appl. No.: 16/106,038

(22) Filed: Aug. 21, 2018

(65) Prior Publication Data

US 2020/0062986 A1 Feb. 27, 2020

(51) Int. Cl.
| | |
|---|---|
| *C09D 11/54* | (2014.01) |
| *C09D 11/38* | (2014.01) |
| *C09D 11/037* | (2014.01) |
| *C09D 11/106* | (2014.01) |
| *C09D 11/033* | (2014.01) |
| *C09D 11/322* | (2014.01) |

(52) U.S. Cl.
CPC ............ *C09D 11/54* (2013.01); *C09D 11/033* (2013.01); *C09D 11/037* (2013.01); *C09D 11/106* (2013.01); *C09D 11/322* (2013.01); *C09D 11/38* (2013.01)

(58) Field of Classification Search
CPC ..... C09D 11/54; C09D 11/033; C09D 11/037; C09D 11/106; C09D 11/322; C09D 11/38
USPC .......................................................... 524/60
See application file for complete search history.

(56) References Cited

U.S. PATENT DOCUMENTS

| | | | |
|---|---|---|---|
| 6,761,764 B2 | 7/2004 | Kredlinger et al. | |
| 8,034,422 B2 | 10/2011 | Dannhauser et al. | |
| 8,092,873 B2 | 1/2012 | Wang et al. | |
| 8,562,126 B1 | 10/2013 | Xiang et al. | |
| 9,067,448 B2 * | 6/2015 | Dannhauser | B41M 5/0017 |
| 9,376,582 B1 * | 6/2016 | Dannhauser | B41M 5/0047 |
| 9,421,808 B2 | 8/2016 | Ferrar et al. | |
| 9,427,975 B2 | 8/2016 | Bugner et al. | |
| 9,434,201 B2 | 9/2016 | Dannhauser et al. | |
| 9,573,349 B1 | 2/2017 | Dannhauser et al. | |
| 2003/0203134 A1 | 10/2003 | Sheng | |
| 2011/0091666 A1 | 4/2011 | Wang et al. | |

OTHER PUBLICATIONS

Hydrocerf 797, Technical data sheet, Dec. 18, 2017. (Year: 2017).*

* cited by examiner

*Primary Examiner* — Hui H Chin
(74) *Attorney, Agent, or Firm* — J. Lanny Tucker

(57) ABSTRACT

An inkjet receiving medium having enhanced surface properties has a substrate and a topcoat layer disposed thereon. The topcoat layer has: (a) one or more water-soluble salts of a multivalent metal cation; and (b) composite particles having a Rockwell Hardness of less than or equal to R90 and each of the composite particles comprising domains of a (i) first organic polymer and domains of a (ii) second organic polymer. The domains of the (ii) second organic polymer are dispersed within the domains of the (i) first organic polymer. The melting point of the (i) first organic polymer is lower than the melting point of the (ii) second organic polymer. The weight ratio of the (i) first organic polymer to the (ii) second organic polymer is chosen such that the (b) composite particles have a density of 1.0-1.5 g/ml.

20 Claims, 2 Drawing Sheets

INKJET RECEIVING MEDIA

RELATED APPLICATIONS

Reference is made to the following copending and commonly assigned patent applications, the disclosures of all of which are incorporated herein by reference:

U.S. Publication No. 2020/0062985, by Irving and Dannhauser, and entitled "Aqueous Pre-treatment Compositions for Inkjet Printing";

U.S. Publication No. 2020/0062987, by Dannhauser and Irving, and entitled "Method for Providing Inkjet Receiving Media" and U.S. Serial No. Publication No. 2020/0062017, by Irving and Dannhauser and entitled "Method for Inkjet Printing and Printed Article."

FIELD OF THE INVENTION

This invention relates to the field of inkjet printing. More particularly, it relates to inkjet receiving media prepared using an aqueous pre-treatment composition on a substrate, having enhanced inkjet printing and image properties. This inkjet receiving media can be inkjet printed using aqueous pigment-based inks or aqueous colorless inks.

BACKGROUND OF THE INVENTION

It is well known to deposit aqueous inks, particularly those having dispersed pigment colorants onto a substrate having cations of a multivalent metal salt on the surface thereof. The presence of such multivalent metal cations can be used to prevent deposited ink drops from penetrating too far below the surface of a water-absorptive substrate, thereby preventing a lowering of optical density. The multivalent metal cations can also be used to prevent bleeding or coalescing of adjacent deposited ink drops of the same or different colors on a less absorbent substrate such as a hydrophobic substrate, thereby preventing the formation of blurry or grainy appearing images. Surface treatments comprising aqueous salts of multivalent metal ions are particularly advantageous for high speed printing with page-wide inkjet arrays whereby adjacent drops of ink are deposited within just a few microseconds of each other onto the substrate.

U.S. Pat. No. 9,434,201 (Dannhauser et al.) describes inkjet receiving media suitable for high speed inkjet printing which includes a substrate having a topmost layer coated thereon comprising an aqueous soluble salt of a multivalent metal cation and a cross-linked hydrophilic polymer binder.

U.S. Pat. No. 8,562,126 (Xiang et al.) describes inkjet receiving media comprising a substrate and a topmost layer coated thereon, wherein the topmost layer includes one or more aqueous soluble salts of multivalent metal cations, a cationic polyelectrolyte comprising amidine moieties, and a second polymer which is distinct from the cationic polyelectrolyte comprising amidine moieties. These coatings have improved certain aspects of durability.

Further improvements in durability can be provided using the teaching of U.S. Pat. No. 9,427,975 (Bugner et al.) in which an inkjet printed image is immediately dried after printing, subjected to pure water and heat, and then returned to ambient conditions.

U.S. Pat. No. 9,067,448 (Dannhauser, et al.) describes a topmost layer on inkjet receiving media that includes particles comprised primarily of a waxy polymer and having a Rockwell Hardness of less than R90 and a mode equivalent spherical diameter of at least about 2 micrometers. These particles can be included with the more common aqueous soluble salts of multivalent metal cations. This combination of materials provides more durable media for high speed inkjet printing particularly where the chosen substrates are hydrophobic, such as glossy or semi-glossy coated papers. The resulting inkjet printed images have high image quality, high optical density, and good physical durability (that is, resistance to smearing and wet and dry abrasion).

However, the aqueous substrate "pre-treatment" formulations described in U.S. Pat. No. 9,067,448 (noted above) could be further improved. Some of the particulate waxes described in the publication have a density less than the bulk fluid which forces them to float and to assemble into a coherent structure, making them difficult to re-disperse after standing or particularly during storage. Some of the best particulate waxes such as poly(tetrafluoroethylene) (Teflon) are much denser than the bulk fluid which forces them to settle and pack on the bottom of storage containers, also making them very difficult to re-disperse when the customer is ready to use the aqueous compositions on substrates. It is these problems to which the present invention is addressed.

SUMMARY OF THE INVENTION

The present invention provides an inkjet receiving medium comprising a substrate and a topcoat layer disposed thereon, which topcoat layer comprises:

(a) one or more water-soluble salts of a multivalent metal cation; and (b) composite particles having a Rockwell Hardness of less than or equal to R90 and each of the composite particles comprising domains of a (i) first organic polymer and domains of a (ii) second organic polymer, wherein:

the domains of the (ii) second organic polymer are dispersed within the domains of the (i) first organic polymer;

the melting point of the (i) first organic polymer is lower than the melting point of the (ii) second organic polymer; and the weight ratio of the (i) first organic polymer to the (ii) second organic polymer is chosen such that the (b) composite particles have a density of at least 1.0 g/ml and up to and including 1.5 g/ml.

The present invention provides a solution to the problems of wax segregation noted above that have been encountered using known compositions for pre-treatment of inkjet printable substrates. Certain particulate waxes have been found that solve the segregation problems and are useful in such compositions to provide desired substrate durability and image quality. These particulate waxes have densities on average higher than water. The aqueous compositions used as pre-treatment fluids have a density higher than water because the fluid compositions contain dissolved salts. Due to their synthesis method, the particles used in the present invention have a distribution of densities near the treatment fluid density. Thus, individual composite particles used in the present invention may float, be neutrally buoyant, or sink. However, the floating composite particles are not so much less dense than the aqueous composition that they segregate into a coherent structured layer and the sinking composite particles are not so much denser than the aqueous composition that they compact into a dense sediment layer. Thus, after lengthy storage, the composite waxes used in the present invention are much more easily re-dispersed than the waxes or wax mixtures described in U.S. Pat. No. 9,067,448 (noted above).

DETAILED DESCRIPTION OF THE INVENTION

Figure 1:
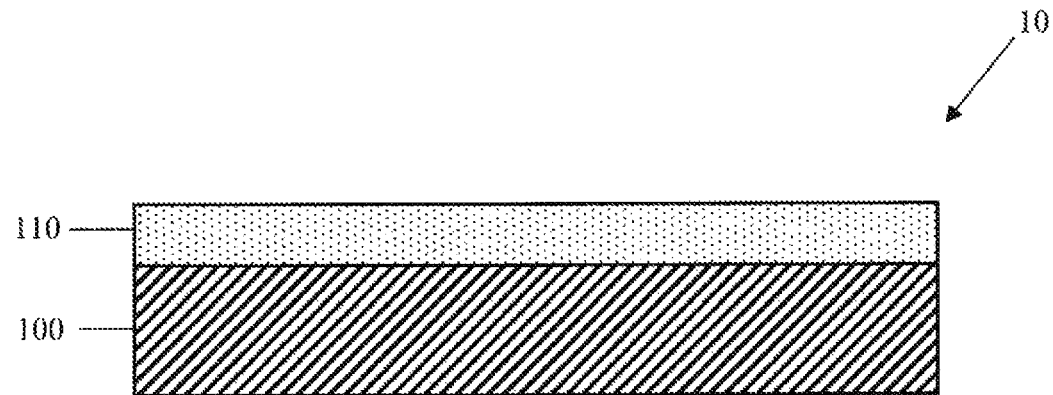
FIG. 1 shows a partial cross-sectional view of a simple embodiment of an inkjet receiving medium according to the present invention.

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described in the discussion of any specific embodiment.

Definitions

As used herein to define various components of the aqueous compositions, topcoat layers, aqueous pigment-based inks, and other materials used in the practice of this invention, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term should be interpreted to have a standard dictionary meaning.

The use of numerical values in the various ranges specified herein, unless otherwise expressly indicated otherwise, are to be considered as approximations as though the minimum and maximum values within the stated ranges were both preceded by the word "about." In this manner, slight variations above and below the stated ranges may be useful to achieve substantially the same results as the values within the ranges. In addition, unless otherwise indicated, the disclosure of these ranges is intended as a continuous range including every value between the minimum and maximum values as well as the end points of the ranges.

As used herein, the parameter "acid number" (also known as acid value) is defined as the milligrams (mg) of potassium hydroxide required to neutralize 1 g of the described acidic polymer.

The term "aqueous" in aqueous compositions, aqueous organic pigment dispersions, and aqueous pigment-based inks according to the present invention means that the water content is greater than 60 weight %, or at least 80 weight % based on the total weight of all solvents. Thus, water is the predominant solvent.

Rockwell Hardness values for many polymeric materials can be learned from literature published on-line by Plastics International (http://www.plasticsintl.com) and the values can be measured according to ASTM D785-51.

Median particle size as equivalent spherical diameter (ESD) particle size, in micrometers (μm), can be determined using a Horiba Particle Size Distribution Analyzer (Horiba Semiconductor) using procedures desired for use with this instrument.

The term "water-soluble" when used in reference to salts of multivalent metal cations refers to a solubility in water of at least 0.5 g of salt in 100 ml of water at 20° C.

For clarification of definitions for any terms relating to polymers, reference should be made to "Glossary of Basic Terms in Polymer Science" as published by the International Union of Pure and Applied Chemistry ("IUPAC"), *Pure Appl. Chem.* 68, 2287-2311 (1996). However, any definitions explicitly set forth herein should be regarded as controlling.

As used herein, the term "polymer" is used to describe compounds with relatively large molecular weights formed by linking together many small reacted monomers. As the polymer chain grows, it folds back on itself in a random fashion to form coiled structures. With the choice of solvents, a polymer can become insoluble as the chain length grows and become polymeric particles dispersed in the solvent medium. These particle dispersions can be very stable and useful in topcoat layers described for use in the present invention. In this invention, unless indicated otherwise, the term "polymer" refers to a non-crosslinked material. Thus, crosslinked polymeric particles differ from the non-crosslinked polymeric particles in that the latter can be dissolved in certain organic solvents of good solvating property whereas the crosslinked polymeric particles may swell but do not dissolve in the organic solvent because the polymer chains are connected by strong covalent bonds.

The term "copolymer" refers to polymers composed of two or more different repeating or recurring units that are arranged along the polymer backbone.

The term "backbone" refers to the chain of atoms in a polymer to which a plurality of pendant groups can be attached. An example of such a backbone is an "all carbon" backbone obtained from the polymerization of one or more ethylenically unsaturated polymerizable monomers.

Recurring units in polymers described herein are generally derived from the corresponding ethylenically unsaturated polymerizable monomers used in a polymerization process, which ethylenically unsaturated polymerizable monomers can be obtained from various commercial sources or prepared using known chemical synthetic methods.

Unless otherwise indicated, the term "weight %" refers to the amount of a component or material based on the total weight of an aqueous composition, aqueous formulation, or dry layer.

As used herein, the term "layer" or "coating" can consist of one disposed or applied layer or a combination of several sequentially disposed or applied layers, such as sub-layers.

Uses

The aqueous compositions described herein can be used to provide inkjet receiving media that can be advantageously used in aqueous inkjet printing methods, including those utilizing continuous inkjet printing apparatus and systems.

Aqueous "Pre-Treatment" Compositions

The aqueous pre-treatment compositions (or "aqueous compositions") according to the present invention generally have at least 2% solids and up to and including 50% solids, or even at least 4% solids and up to and including 25% solids.

The aqueous compositions must comprise one or more (a) water-soluble salts of a multivalent metal cation. Mixtures of such salts having the same multivalent metal cation, and mixtures of salts having different multivalent cations can be used, in any desired proportion. Generally, each of these salts is colorless and non-reactive with other materials in the aqueous compositions. For example, such salts comprise one or more multivalent cations such as magnesium (+2), calcium (+2), barium (+2), zinc (+2), or aluminum (+3). The magnesium (+2) and calcium (+2) cations are particularly useful, in combination with suitable counterions.

Examples of useful (a) water-soluble salts of a multivalent metal cation include but are not limited to, calcium chloride, calcium acetate, calcium nitrate, magnesium chloride, magnesium acetate, magnesium nitrate, barium chloride, barium nitrate, zinc chloride, zinc nitrate, aluminum chloride, aluminum hydroxychloride, and aluminum nitrate. Hydrated versions of these salts can also be used. Other useful salts would be readily apparent to a skilled artisan. Particularly useful water-soluble salts of a multivalent metal cation comprise one or more of $CaCl_2$, $Ca(CH_3CO_2)_2$, $MgCl_2$, $Mg(CH_3CO_2)_2$, $Ca(NO_3)_2$, or $Mg(NO_3)_2$, or hydrated versions of these salts.

The amount of the (a) water-soluble salts of multivalent metal cations in the aqueous composition according to the present invention can be sufficient to provide at least 0.6% solids and up to and including 49% solids, or at 1% solids and up and including 24% solids.

The aqueous compositions according to this invention also comprise (b) composite particles having a Rockwell Hardness of less than or equal to R90, or less than or equal to R75. Rockwell Hardness can be determined as described above.

In general, each (b) composite particle comprises domains of a (i) first organic polymer and domains of a (ii) second organic polymer, both of which are defined in more detail below. The domains of the (ii) second organic polymer are dispersed, uniformly or non-uniformly, within the domains of the (i) first organic polymer.

Moreover, the melting point of the (i) first organic polymer is lower than (by at least 30° C.) the melting point of the (ii) second organic polymer.

The weight ratio of the (i) first organic polymer to the (ii) second organic polymer is chosen such that the (b) composite particles have a density of at least 1.0 g/ml and up to and including 1.50 g/ml, or more likely of at least 1.05 g/ml and up to and including 1.35 g/ml, or even of at least 1.05 g/ml and up to and including 1.20 g/ml. Particle density can be determined using known procedures and equipment such as gas pycnometry or mercury porosimetry.

The (b) composite particles can also have an average equivalent spherical diameter (ESD) particle size of at least 2 μm, or at least 3 μm, and up to and including 8 μm or up to and including 12 μm. The ESD of such particles can be adapted so that it is at least 0.1 μm greater, or at least 0.2 μm greater, than the sum of the dry thickness of the topcoat layer (described below) and any dry inkjet printed image or layer (described below).

Useful polymeric materials that can form the (i) first organic polymer domains include but are not limited to, a polyethylene, a polypropylene, ethylene bi-stearamide, polyethylene-polypropylene copolymer, carnauba wax, a synthetic hydrocarbon wax (especially those produced by the Fischer-Tropsch process as described in Industrial Waxes, Vol. 1 by H. Bennett), a polyamide, or a combination of two or more of these materials.

Useful polymeric materials that can form the (ii) second organic polymer domains include but are not limited to, poly(tetrafluoroethylene) (PTFE or Teflon).

The amount of useful (b) composite particles present in the aqueous composition is generally at least 0.02% solids and up to and including 5% solids, or more likely at least 0.05% solids and up to and including 4% solids.

The aqueous compositions according to this invention can also comprise one or more (c) water-soluble or water-dispersible binder materials, all of which are different in chemical composition from the (b) composite particles described above. Such materials can be chosen from poly (vinyl alcohol)'s, polyethylene oxide, polyvinyl amine, copolymers derived at least in part from vinyl alcohol and ethylene oxide, copolymers derived at least in part from vinyl alcohol and a vinyl amine, poly(vinyl pyrrolidone), cellulose materials (including cellulose and derivatives thereof, such as hydroxycellulose), gelatin and derivatives thereof, starches, crosslinkable hydrophilic binder materials [such as those described in U.S. Patent 2011/0279554 (Dannhauser et al.), the disclosure of which is incorporated herein by reference], cationic polyelectrolytes, polyurethanes, and silanol-modified poly(vinyl alcohol)'s. Such materials are generally capable of absorbing water and additionally capable of forming a continuous phase solution.

For example, a useful (c) water-soluble or water-dispersible binder material is an acetylacetate-modified poly(vinyl alcohol). In crosslinked form, such materials in the topcoat layer provide resistance to abrasion in the wet form and increased cohesion in the dry form.

It may be useful to include one or more crosslinking agents in the aqueous composition to promote crosslinking of the crosslinkable hydrophilic binder materials that are present. The identity and amount of crosslinking agent will depend upon the choice of crosslinkable hydrophilic binder material and its reactivity with the crosslinking agent, the number of crosslinking sites available, its compatibility with other materials in the aqueous composition, and manufacturing constraints such as solution pot life and coating drying speed. Representative crosslinking agents include but are not limited to, glyoxal, CARTABOND® TSI and EPI (Clariant), SEQUAREZ™ 755 (Omnova), glutaraldehyde sodium bisulfate complex (Aldrich), Sunrez 700 M and 700C (Omnova), bis(vinyl) sulfone), bis(vinyl)sulfone methyl ether, adipoyl dihydrazide, epichlorohydrin polyamide resins, and urea-formaldehyde resin.

Useful cationic polyelectrolytes can comprise amidine moieties, polyamide-epichlorohydrin polymers, polyamine solution polymers, as described in U.S. Pat. No. 9,067,448 (Dannhauser et al.), Cols. 9-10, the disclosure of which is incorporated herein by reference.

Useful polyurethanes can be dispersions of polyurethane particles in aqueous medium, for example as described in U.S. Pat. No. 9,067,448 (Col. 10, lines 36-48).

Useful silanol-modified poly(vinyl alcohol)s are described for example, in U.S. Pat. No. 9,067,448 (Col. 10, lines 49-68).

Mixtures of the same or different types of (c) water-soluble or water-dispersible binder materials can be used if desired.

The amount of one or more (c) water-soluble or water-dispersible binder materials in the aqueous composition according to this invention can be at least 0.1 weight % and up to and including 30 weight %, based on the total aqueous composition weight.

It can be also useful to include one or more types of (d) organic or inorganic particles in the aqueous composition, which particles are different from the (a) one or more water-soluble salts of a multivalent metal cation and the (b) composite particles described above. Such organic or inorganic particles can include but are not limited to, particles of kaolin clay, montmorillonite clay, delaminated kaolin clay, calcium carbonate, calcined clay, silica gel, silica (such as fumed silica or colloidal silica), talc, wollastinite, fumed alumina, colloidal alumina, titanium dioxide, zeolites, and organic particles such as those marketed as Dow HS3000NA. A silica is particularly useful. The amounts of such particles in the aqueous composition can be up to and including 30 weight %, based on the total aqueous composition weight.

The aqueous compositions can be prepared by suitably mixing the various materials described above in a desired mixing order and with suitable equipment, in an aqueous medium that is predominantly water. Thus, at least 60 weight %, or even at least 80 weight % of the aqueous medium is comprised of water, based on the weight of all solvents.

The aqueous composition according to this invention can have a dynamic viscosity, as measured at 25° C. using a standard rolling ball viscometer, of less than or equal to 50 centipoises (50 mPa-sec) or at least 200 centipoises (200 mPa-sec) or at least 1.5 centipoise (1.5 mPa-sec) and up to and including 100 centipoise (100 mPa-sec).

Representative aqueous compositions are described below in the working Examples.

Inkjet Receiving Media

As shown in FIG. 1, a simple embodiment according to the present invention is inkjet receiving medium 10 having substrate 100 on which topcoat layer 110 is disposed, and substrate 100 and topcoat layer 110 are contiguous or in direct contact with each other. In general, substrate 100 can be opaque, semi-transparent, translucent, or transparent.

Suitable substrates are typically planar in nature with two opposing surfaces or supporting sides. Substrates can have a single "layer" or stratum or be composed of multiple layers or strata composed of the same or different materials. In most instances, a substrate has a predominant material, such as a cellulosic material that is coated or layered with one or more other types of materials such as polymeric coatings.

Thus, useful substrate materials from which substrate 100 can be constructed include but are not limited to, glossy, semi-glossy, or matte coated lithographic offset papers that typically comprise a paper base (support) that has been coated with a clay or similar materials and has undergone surface calendering treatment to provide a desired surface smoothness. Such substrates include both glossy coated and matte coated lithographic offset papers, and can be obtained from various commercial sources including for example International Paper, Sappi, NewPage, Appleton Coated, Abitibi-Bowater, Mohawk Papers, Verso, Mitsubishi, Norpac, Domtar, and others readily known to a skilled artisan.

In various embodiments according to this invention, the substrate can be readily hydrophilic and be capable of absorbing and transferring aqueous ink colorant (such as pigment colorants) to the substrate interior prior to the topcoat layer being formed thereon (such as being coated thereon) with the aqueous compositions described herein. For example, such a hydrophilic substrate can be porous.

Alternatively, the substrate can have a hydrophobic surface prior to the topcoat being formed thereon. This hydrophobic surface can be substantially impermeable to water or an aqueous ink composition. Thus, the topcoat layer provides a continuous hydrophilic surface relative to the hydrophobic surface of such substrate.

Other useful substrates include coated and uncoated offset papers and other plain papers, as well as any other materials typically used as inkjet receiving media such as resin-coated papers, polyester films, microporous materials such as polyethylene-containing materials, composite films, plain coated and uncoated papers, synthetic papers, photographic paper supports, melt-extrusion-coated papers, and laminated papers such as biaxially oriented support laminates such as those described in Col. 6 (line 50) to Col. 7 (line 2) of U.S. Pat. No. 9,067,448 (noted above).

If a water-impermeable (hydrophobic) substrate is used according to this invention, the surface to be coated can be modified to increase the static surface energy to greater than 45 dynes/cm (or at least 50 dynes/cm and up to and including 60 dynes/cm) in order to provide adequate wettability for application and formation of the topcoat layer. Surface energy modification can be carried out using corona discharge treatment (CDT), plasma discharge treatment, flame ionization treatment, atomic layer deposition, or similar treatments known in the art.

Figure 2:
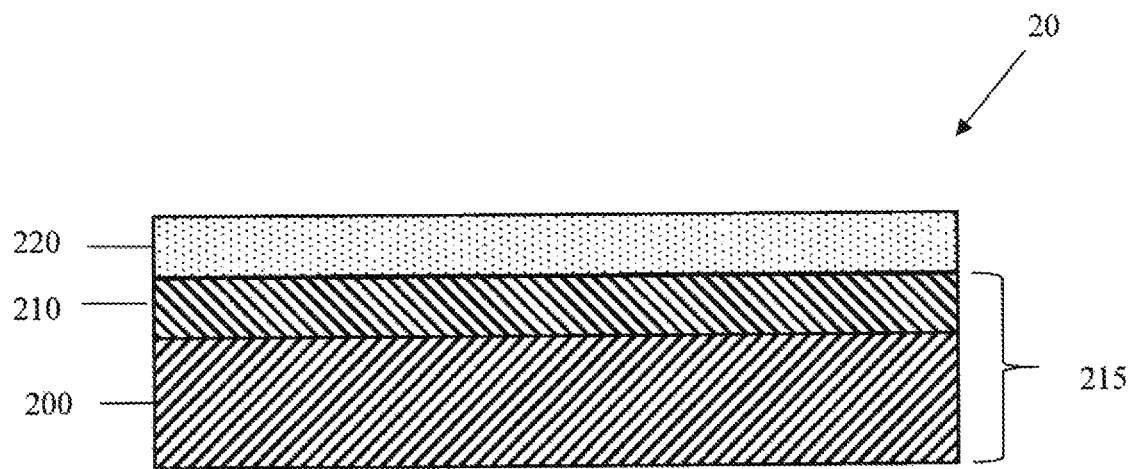
FIG. 2 shows a partial cross-sectional view of still another embodiment of an inkjet receiving medium according to the present invention comprising multiple layers.

FIG. 2 illustrates another embodiment according to this invention in which inkjet recording medium 20 comprises support 200 that can be water-impermeable and first layer 210 disposed on at least one surface of support 200, which together form substrate 215 for the inkjet receiving medium according to the present invention. First layer 210 can comprise a water-based tie layer composition (described below) and is located underneath topcoat layer 220. In many embodiments, support 200 can be composed of a water-impermeable material such as a polymeric film, or a co-extrudate or a laminate of two more polymeric films as referred to above in U.S. Pat. No. 9,067,448 (Cols. 6-7).

First layer 210 can be known in the art as a "tie-layer" and is generally water-based meaning that it is provided from an aqueous formulation, and serves to improve the adhesion of topcoat layer 220 to support 200 when it is composed of a hydrophobic material such as a polymeric film (such as a polyester film) or a polyethylene coated paper. Examples of hydrophilic materials useful for composing first layer 210 (or tie-layers) include but are not limited to, halogenated phenols, partially hydrolyzed vinyl chloride-vinyl acetate copolymers, vinylidene chloride-methyl acrylate-itaconic acid terpolymers, vinylidene chloride-acrylonitrile-itaconic acid terpolymers, and glycidyl (meth)acrylate polymers. Other useful materials include any polymers, copolymers, reactive polymers and copolymers, and mixtures thereof, that exhibit effective bonding between the topcoat layer and the substrate. Water-soluble or water-dispersible polymers can also be used including but not limited to, poly(vinyl alcohol)s, polyvinyl amine, poly(vinyl pyrrolidone), gelatin and gelatin derivatives, cellulose ethers, poly(oxazoline), poly(vinyl acetamide), partially hydrolyzed poly(vinyl acetate/polyvinyl alcohol), poly(acrylic acid), poly(acrylamide), poly(alkylene oxide)s, sulfonated or phosphonated polyesters or polystyrenes, casein, zein, albumin, chitin, chitosan, dextran, pectin, a collagen derivative, collodion, agar-agar, arrowroot, guar, carrageenan, tragacanth, xanthan, rhamsan, and various polymeric lattices. Particularly useful tie-layer materials are polyvinyl alcohols, polyvinyl amine, gelatin or a gelatin derivative, poly(ethyleneimine), an epoxy resin, polyurethanes, polyacrylamides and derivatives or copolymer thereof, and mixtures of any of these materials.

While first layer 210 can be a single discrete layer, it can also comprise two or more water-based sub-layers, each of which comprises the same or different hydrophilic materials described above. For example, first layer 210 can comprise a first sub-layer and a second sub-layer, the first sub-layer comprising poly(ethyleneimine) and an epoxy resin modified with an acidified aminoethylated vinyl polymer, and the second sub-layer that is disposed on the first sub-layer comprising a crosslinked polyvinyl alcohol.

The total dry coverage of the one or more hydrophilic materials in first layer 210 (or a tie-layer), whether comprised of a single district layer or multiple sub-layers, can be at least 0.05 $g/m^2$ and up to and including 12 $g/m^2$, or at least 0.05 g/m² and up to and including 8 g/m², or at least 0.05 g/m² and up to and including 3 g/m².

Further details about first layer 210 (or tie-layer) construction and materials are provided in U.S. Pat. No. 9,376,582 (Dannhauser et al.), the disclosure of which is incorporated herein by reference.

In still other embodiments of inkjet recording media according to the present invention (not illustrated), a topcoat layer can be formed on opposing surfaces of a substrate, and the individual topcoat layers can be composed of the same or different materials, have the same or different average dry thicknesses, or be formed using the same or different processes.

For all the inkjet recoding media embodiments according to the present invention, the topcoat layer, upon drying, generally has a dry solids coating weight of at least 0.1 g/m² and up to and including 10 g/m², or at least 0.1 g/m² and up to and including 5 g/m².

Within the dry topcoat layer, the (a) one or more water-soluble salts of a multivalent metal cation, described above, are generally present in an amount of at least 10 weight % and up to and including 98 weight %, or of at least 15% and up to and including 95 weight %, based on the total weight of the topcoat layer. In general, the amounts in these aqueous compositions will provide, at least 1.2 weight % and up to and including 50 weight % of the multivalent metal cation, based on the total weight of the topcoat layer.

For example, the (a) one or more water-soluble salts of a multivalent metal cation are generally present in an amount sufficient to provide the multivalent cation (such as calcium cation) in the topcoat layer in an amount of at least 0.01 g/m² and up to and including 1 g/m².

In addition, the (b) composite particles, described above, are generally present in the topcoat layer in an amount of at least 0.2 weight % and up to and including 30 weight %, or of at least 0.5 weight % and up to and including 20 weight %, based on the total weight of the topcoat layer.

For example, the (b) composite particles can have a Rockwell Hardness of less than or equal to R75 and be present in the topcoat layer in a dry coating weight of at least 0.01 g/m² and up to and including 0.1 g/m².
In some embodiments, the (b) composite particles can have an ESD that is at least 0.1 µm greater than sum of the dry thickness of the topcoat layer and the dry thickness of any inkjet printed image or layer.

If present, the amount of one or more (c) water-soluble or water-dispersible binder materials in the topcoat layer are present in an amount of at least 1% and up to and including 69%, based on the total weight of the topcoat layer.

The topcoat layer can also comprise (d) organic or inorganic particles as described above, which particles are different in chemical composition from the (a) one or more water-soluble salts and the (b) particles, in an amount of at least 1 weight % and up to and including 40 weight %, based on the total weight of the topcoat layer.

The resulting inkjet recording medium can be used for various purposes but it is particularly useful for inkjet printing methods to provide an image or layer on an inkjet printed article. Such inkjet printed articles then can have a substrate and topcoat layer for example as illustrated in each of FIGS. 1 and 2, on which an aqueous-based inkjet printing image or layer is disposed over (for example, directly on) the topcoat layer.

As described in more detail below, an inkjet printed image or layer can be formed by inkjet printing one or more aqueous-based inkjet ink compositions that are described below.

Method for Making Inkjet Receiving Media

An aqueous composition (or topcoat layer formulation) according to this invention can be used to prepare or form a topcoat layer on one or both opposing sides (or surfaces) of a substrate (as described above), or alternatively to only one of those opposing sides (or surface). Thus, a substrate is chosen and an aqueous composition according to this invention is disposed on at least one surface of the substrate to provide a topcoat layer. The result of these operations is an inkjet receiving medium useful for inkjet printing as described below.

The method procedures and apparatus used to accomplish this can be selected from various known techniques and apparatus, including but not limited to spraying, rod coating, blade coating, gravure coating, (direct, reverse, or offset), flexographic coating, size press (puddle and metered), extrusion hopper coating, and curtain coating, using suitable equipment for these purposes. After drying using suitable drying conditions and equipment, glossiness of the resulting topcoat layer can be increased using any suitable means for example, with or without calendering.

In some embodiments, a topcoat layer can be formed in-line as part of a substrate manufacturing process (such as a paper making process). Alternatively, the topcoat layer can be formed in a separate coating step after the manufacture of the substrate. Moreover, the topcoat layer can be formed in-line as part of an inkjet printing operation, wherein the aqueous composition is applied to a substrate in a "pre-coating" or "pre-treatment" station prior to printing of inkjet ink printing compositions. Such pre-coating operations can be designed to provide uniform coverage of the topcoat layer, or in some instances, only a specific area of the substrate can be provided with the aqueous composition. While the applied aqueous composition can be dried completely before inkjet image printing, complete drying may not be necessary and overall drying of both applied topcoat layer and inkjet printed image or layer can be carried out at the same time.

If an inkjet printed medium is prepared with a first layer (tie-layer) or multiple sub-layers, as described above, it can be formed on the substrate using techniques and equipment described above for the topcoat layer. For example, the first layer and topcoat layer can be separately formed on the substrate in distinct or separate coating operations with an intermediate drying operation. Alternatively, the first layer can be formed in-line as part of an inkjet receiving media manufacturing or an inkjet printing operation so that multiple layers are formed or applied sequentially with or without drying between layer applications. Further details of such processes are provided in Cols. 7-8 of U.S. Pat. No. 9,376,582 (noted above). The formation of multiple layers in inkjet receiving media is particularly desirable using slide-hopper and curtain coating techniques. Useful dry coating coverages for first layer (tie-layers) are described above.

Method and Apparatus for Inkjet Printing

Inkjet receiving media according to the present invention can be inkjet printed with one or more aqueous pigment-based inks comprising one or more pigment colorants to provide a pigment-based image or layer. These aqueous pigment-based inks can be printed onto the topcoat layer of the inkjet receiving media designed and prepared as described above, for example those having coated offset paper substrates. The inkjet printing methods according to the present invention can be used for printing periodicals, newspapers, magazines, greeting cards, plastic wrap, paperboard, and other materials that would be readily apparent to one skilled in the art.

While the aqueous compositions according to this invention may be useful in inkjet receiving medium useful in one or more drop-on-demand (DOD) printing systems, the advantages of the present invention are also evident when the present invention is carried out using continuous inkjet (CIJ) printing processes and equipment. There are several CIJ printing processes known in the art, and the present invention is not limited to a CIJ process, but there may be certain CIJ processes that are more useful than others. In general, such CIJ processes use one or more aqueous pigment-based inks that are ejected through one or more printheads (containing nozzles) and unprinted aqueous pigment-based ink is collected and recycled through the printing system multiple times until it is used up. In addition, the CIJ printing system can have incorporated replenisher systems. Details of such CIJ processes and equipment are provided for example in U.S. Pat. No. 8,173,215 (Sowinski et al.), the disclosure of which is incorporated herein by reference.

Thus, in most CIJ inkjet printing processes, each aqueous pigment-based ink can be ejected or printed from a main fluid supply dedicated to it only, as a continuous stream of the aqueous pigment-based ink that is broken into both printing drops and non-printing drops. The non-printing drops of each aqueous pigment-based ink can be collected using suitable collecting means such as a "catcher" and returned to its respective main fluid supply. This entire scenario can be carried out using a single (first) aqueous pigment-based ink alone, or in combination with one or more "additional" aqueous pigment-based inks having the same or different "colors" or hues as the first aqueous pigment-based ink. The multiple aqueous pigment-based inks are then inkjet printed in a chosen sequence that can be controlled by software and digital input, in a controlled manner, to provide a multicolor inkjet printed image on the surface of the inkjet receiving medium.

In addition, inkjet printing of an aqueous "colorless" or aqueous particle-free ink composition or fluid (as described above) can be carried out simultaneously or sequentially with inkjet printing of the "colored" aqueous pigment-based ink(s). For example, according to U.S. Patent Application Publication 2018/0051184 (Lussier et al.), a colorless lacquer or colorless ink compositions can be applied over single- or multi-color pigment-based image or layer. The inkjet receiving media according to the present invention can be used in such printing processes.

Useful CIJ printing processes and equipment can include replenishment systems that measure ink electrical resistivity and are described for example in U.S. Pat. No. 5,526,026 (Bowers), the disclosure of which is incorporated herein by reference and in EP 0597628B1 (Loyd et al.). Useful CIJ printing processes and equipment that employ other means for aqueous pigment-based ink concentration sensing are disclosed in U.S. Pat. No. 7,221,440 (McCann et al.), the disclosure of which is incorporated herein by reference, and in EP 0571784B1 (McCann et al.) and EP 1,013,450B1 (Woolard et al.).

In one embodiment, basic replenishment is carried out as follows: a fluid system contains an ink resistivity measurement cell through which an aqueous pigment-based ink passes as it is being recirculated through the ink handling portion of the system, including the printhead. A calculation means determines the resistance of the ink resistivity cell. A logic and control unit, responsive to the calculation means, controls the transfer of aqueous pigment-based ink from a supplemental "ink" supply and the transfer of an aqueous particle-free fluid ("carrier fluid") from a replenishment carrier fluid supply to the system main fluid supply, to maintain desired resistivity in the aqueous inkjet ink composition. The volume of the aqueous pigment-based ink is monitored by a float valve position, and when a predetermined volume has been depleted, the predetermined volume is replaced by either aqueous pigment-based ink from the supplemental "ink" supply or by carrier fluid from the replenishment carrier fluid supply. Thus, the first and any additional aqueous pigment-based inks can be replenished, respectively, with first and any additional aqueous pigment-based inks.

In other examples, the method according to the present invention can further comprise replenishing a main fluid supply with an aqueous particle-free fluid that has a dynamic viscosity of less than or equal to 5 centipoise (5 mPa-sec) at 25° C. as measured using a rolling ball viscometer.

In some embodiments, the method according to the present invention is carried out using a plurality of printing drops formed from a continuous fluid stream, and non-printing drops of a different volume than the printing drops are diverted by a drop deflection means into a "gutter" for collection and recirculation. Details about such CIJ printing systems and equipment are provided for example in U.S. Pat. No. 6,588,888 (Jeanmaire et al.), U.S. Pat. No. 6,554,410 (Jeanmaire et al.), U.S. Pat. No. 6,682,182 (Jeanmaire et al.), U.S. Pat. No. 6,793,328 (Jeanmaire et al.), U.S. Pat. No. 6,866,370 (Jeanmaire et al.), U.S. Pat. No. 6,575,566 (Jeanmaire et al.), and U.S. Pat. No. 6,517,197 (Hawkins et al.), and in U.S. Patent Application Publications 2002/0202054 (Jeanmaire et al.), the disclosures of all of which are incorporated herein by reference.

In other embodiments, an aqueous pigment-based ink can be printed using an apparatus capable of controlling the direction of the formed printing drops and non-printing drops by asymmetric application of heat to the fluid stream that initializes drop breakup and serves to steer the resultant drop as described for example in U.S. Pat. No. 6,079,821 (Chwalek et al.) and U.S. Pat. No. 6,505,921 (Chwalek), the disclosure of both of which are incorporated herein by reference. Useful agitation, heated supply, printhead, and fluid filtration means for CIJ printing are described for example in U.S. Pat. No. 6,817,705 (Crockett et al.), the disclosure of which is incorporated herein by reference.

A simple schematic of a CIJ printing system is provided in FIG. 1 of U.S. Pat. No. 8,764,161 (noted above).

The printing methods according to the present invention can be carried out using a continuous high-speed commercial inkjet printer, for example in which the inkjet printer applies colored images using one or more different print heads such as full-width print heads with respect to the inkjet receiving media, in sequence, in which the different colored parts of images are to be registered.

One type of inkjet printing, commonly referred to as "continuous stream" or "continuous inkjet" (CIJ) printing, uses a pressurized ink source that produces a continuous stream of printing drops (droplets) from a main fluid supply for each aqueous pigment-based ink, or a continuous stream that is broken into both printing drops and non-printing drops. Continuous inkjet printers can utilize electrostatic charging devices that are placed close to the point where a filament of working inkjet composition breaks into individual drops that are electrically charged and then directed to an appropriate location by deflection electrodes having a large potential different. Where no color image is desired, the non-printing drops can be deflected into an ink-capturing mechanism and disposed of or recycled by returning them to the original main fluid supply. When a printed color image is desired, the printing drops are not deflected but are allowed to strike the topcoat layer of the inkjet receiver medium in designated locations. Alternatively, deflected printing droplets can be allowed to strike the topcoat layer of the inkjet receiver medium while non-deflected non-printing drops can be collected and returned to the main fluid supply.

CIJ printing systems generally comprise two main equipment components, a fluid system (including one or more ink reservoirs or main fluid supplies) and one or more printheads. Each aqueous pigment-based ink can be pumped through a supply line from its main fluid supply to a manifold that distributes the ink to a plurality of orifices of printheads, typically arranged in linear array(s), under sufficient pressure to cause ink streams to issue from the orifices of the printhead(s). As noted above, stimulations can be applied to the printhead(s) to cause those ink streams to form streams of uniformly sized and spaced drops that are deflected in a suitable manner, into printing or non-printing paths. This discrimination can also be accomplished when the printhead digitally creates large and small drops. In some embodiments, small drops are deflected by an air current and returned to the main fluid supply; and large drops, being less affected by the air current, are printed onto the inkjet receiving medium. In other embodiments, large drops are deflected in a designed manner and small drops are printed. Some useful CIJ printing apparatus and printhead fabrication are described for example in U.S. Pat. No. 6,079,821 (Chwalek et al.), U.S. Pat. No. 6,505,921 (Chwalek et al.), U.S. Pat. No. 6,588,888 (Jeanmaire et al.), U.S. Pat. No. 6,943,037 (Anagnostopoulos et al.), U.S. Pat. No. 6,554,410 (Jeanmaire et al.), U.S. Pat. No. 6,682,182 (Jeanmaire et al.), U.S. Pat. No. 6,793,328 (Jeanmaire), U.S. Pat. No. 6,517,197 (Hawkins et al.), U.S. Pat. No. 6,866,370 (Jeanmaire), and U.S. Pat. No. 6,575,566 (Jeanmaire et al.), U.S. Patent Application Publication 2003/0202054 (Jeanmaire et al.) the disclosures of all of which are incorporated herein by reference.

Useful agitation of an aqueous pigment-based ink, heated main fluid supply, and inkjet printhead and composition filtration means for CIJ ink compositions are described for example in U.S. Pat. No. 6,817,705 (Crockett et al.), the disclosure of which is incorporated herein by reference. Printer replenishing systems for maintaining quality of an aqueous pigment-based ink and to counter the effects of volatile component evaporation are described in U.S. Pat. No. 5,526,026 (Bowers) and U.S. Pat. No. 5,473,350 (Mader et al.), the disclosures of which are incorporated herein by reference, and in EP 0 597 628 A1 (Loyd et al.).

In some embodiments, the method according to the present invention can comprise printing one or more aqueous pigment-based inks onto the topcoat layer of an inkjet receiving medium to provide a pigment-based image in a predetermined pattern using an inkjet deposition system in response to electrical signals.

Moreover, the method according to the present invention can be carried out such that each of the one or more aqueous pigment-based inks is supplied from respective main fluid supplies as continuous streams, each of which continuous stream is broken into both printing drops and non-printing drops; and further collecting and returning the non-printing drops from each continuous stream to respective main fluid supplies.

An aqueous pigment-based ink useful according to the present invention can be prepared from a suitable aqueous dispersion of one or more particulate pigments using known dispersants and dispersing means. The resulting aqueous pigment-based ink can be mixed with one or more humectants and the components are formulated in an aqueous medium (predominantly water) to provide a viscosity of less than or equal to 10 centipoise (10 mPa-sec), or less than or equal to 3 centipoise (3 mPa-sec), or even less than or equal to 1.5 centipose (1.5 mPa-sec), all measured at 25° C. using a standard viscometer.

Each aqueous pigment-based ink useful in the practice of this invention typically comprises one or more particulate, organic or inorganic pigment colorants that will provide the desired color or hue such as black, green, red, yellow, blue, violet, magenta, cyan, white, brown, grey and others known in the art. Pigment colorants can be present individually or in mixtures in each aqueous pigment-based ink. For example, aqueous pigment-based inks useful in the present invention comprise one or more pigments selected from a cyan pigment, a magenta pigment, a yellow pigment, a black pigment, a green pigment, an orange pigment, a white pigment, a red pigment, a blue pigment, a violet pigment, and a combination of any of these pigments.

A wide variety of organic and inorganic pigments can be used individually or in combination. For example, a carbon black pigment can be combined with a colored pigment such as a cyan copper phthalocyanine or a magenta quinacridone pigment. Useful pigments are described for example in U.S. Pat. No. 5,026,427 (Mitchell et al.), U.S. Pat. No. 5,141,556 (Matrick), U.S. Pat. No. 5,160,370 (Suga et al.), and U.S. Pat. No. 5,169,436 (Matrick), the disclosures of all of which are incorporated herein by reference.

Useful pigment colorants include but are not limited to, azo pigments, monoazo pigments, disazo pigments, azo pigment lakes, β-naphthol pigments, naphthol AS pigments, benzimidazolone pigments, disazo condensation pigments, metal complex pigments, isoindolinone and isoindoline pigments, quinacridone pigments, polycyclic pigments, phthalocyanine pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium dioxide, iron oxide, and carbon blacks. Specific useful pigment colorants are described in Col. 10 (lines 66) to Col. 11 (line 40) of U.S. Pat. No. 8,455,570 (Lindstrom et al.), the disclosure of which is incorporated herein by reference. Mixtures of pigments can be used to provide a desired hue or color, as described for example in U.S. Pat. No. 9,605,169 (Lussier et al.)

Useful pigments can be accompanied by suitable polymeric or non-polymeric dispersants that are well known in the art (as described above), or the pigment colorants can be self-dispersing and thus dispersible and stable in the aqueous pigment-based ink without the use of dispersants because of the presence of appropriate surface groups. Examples of useful self-dispersing pigment colorants are described in Col. 11 (lines 49-53) of U.S. Pat. No. 8,455,570 (noted above).

Useful pigments can have a median particle diameter of less than 150 nm and more likely less than 100 nm or even less than 50 nm. As used herein, the term "median particle diameter" refers to the $50^{th}$ percentile of the classified particle size distribution such that 50% of the volume of the pigment particles is provided by particles having diameters smaller than the indicated diameter. A laser light scattering device, as described above, can be used to measure the particle size distributions.

Organic or inorganic pigment colorants can be present in each aqueous pigment-based ink in an amount of at least 0.1 weight % and up to and including 30 weight %, or more likely of at least 1 weight % and up to and including 10 weight %, or even at least 1 weight % and up to and including 8 weight %, based on the total weight of the aqueous pigment-based ink.

Each aqueous pigment-based ink generally comprises one or more humectants that are generally water soluble or water miscible organic solvents having a viscosity that is greater than 40 centipoise or even at least 100 centipoise when measured at 25° C. For example, any water-soluble humectant known in the inkjet art that is compatible with the other requirements of the invention can be used. While an individual humectant can be employed, mixtures of two or more humectants, each of which imparts a useful property, can be used. Representative humectants are described for example, in U.S. Pat. No. 9,783,553 (Lussier et al.), the disclosure of which is incorporated herein by reference.

The one or more humectants, such as triethylene glycol, can be present in an amount of at least 0.5 weight %, or at least 1 weight % and up to and including 10 weight %, or at least 3 weight % and up to and including 7 weight %, all based on the total weight of the aqueous pigment-based ink.

Each aqueous pigment-based ink useful according to the present invention can further comprise one or more anionic polyurethanes, each having an acid number of at least 50, or of at least 60 and up to and including 150, or even at least 55 and up to and including 90, which materials are described in more detail below.

Alternatively, or in addition to the anionic polyurethanes, the aqueous pigment-based ink can comprise one or more anionic acrylic or anionic styrene-acrylic polymers, each having an acid number of at least 50, or of at least 120 and up to and including 240, or even at least 160 and up to and including 220, which polymers are described in more detail below.

Representative examples of both types of polymers are described for example in U.S. Pat. No. 8,430,492 (Falkner et al.) and U.S. Pat. No. 9,783,553 (noted above). Particularly useful anionic polyurethanes contain a polyether diol unit and can be identified as polyether polyurethanes. Such anionic polyether polyurethanes generally can have a molecular weight ($M_w$) of at least 10,000 Daltons and up to and including 30,000 Daltons or at least 15,000 Daltons and up to and including 25,000 Daltons. For example, particularly useful polyether polyurethanes are individually represented by Structure (I) in U.S. Pat. No. 9,783,553 (noted above).

Useful water-soluble or water-dispersible anionic polyether polyurethanes can be prepared as described for example in [0045]-[0049] of U.S. Patent Application Publication 2008/0207811 (Brust et al.), the disclosure of which is incorporated herein by reference. The acidic groups in the anionic polyether polyurethanes can be at least partially and up to 100% neutralized (converted into salts) using monovalent inorganic bases such as alkaline metal hydroxides or organic amines such as dimethylethanolamine.

Representative anionic acrylic polymers and anionic styrene-acrylic polymers useful in the present invention are described for example in [0061] of U.S. Patent Application Publication 2008/207811 (noted above). Examples of useful anionic styrene-acrylic polymers include those commercially available under the trademarks JONCRYL® (S.C. Johnson Co.), TRUDOT® (Mead Westvaco Co.), and VANCRYL® (Air Products and Chemicals, Co.).

In addition, modified polysiloxanes can be present in the aqueous pigment-based ink(s). Examples of such materials are ethoxylated or propoxylated silicone-based "surfactants" that can be obtained commercially under the trademarks SILWET® (CL Witco), and BYK® (Byk Chemie) such as BYK® 348 and 381, as well as Dow Corning DC67, DC57, DC28, DC500W, and DC51. Non-silicone surfactants can also be used, including but not limited to anionic, cationic, nonionic, or amphoteric surfactants such as those commercially available as SURFYNOL® surfactants (Air Products) including SURFYNOL® 440 and 465 alkynediol surfactants.

Colorless fluorescent colorants (dyes or pigments) can also be present in the aqueous pigment-based ink and examples of such compounds are described in U.S. Patent Application Publication 2014/231674 (Cook), the disclosure of which is incorporated herein by reference.

Other additives that can be present in the aqueous pigment-based inks, in amounts that would be readily apparent to one skilled in the art, include but are not limited to, thickeners, conductivity-enhancing agents, drying agents, waterfast agents, viscosity modifiers, pH buffers, antifoamants, wetting agents, corrosion inhibitors, biocides, fungicides, defoamers (such as SURFYNOL® DF110L, PC, MD-20, and DF-70), UV radiation absorbers, antioxidants, and light stabilizers available under the trademarks TINUVIN® (Ciba) and IRGANOX® (Ciba), as well as other additives described in Col. 17 (lines 11-36) of U.S. Pat. No. 8,455,570 (noted above).

Water is generally present in each aqueous pigment-based ink in an amount of at least 75 weight % or at least 80 weight %, and generally at no more than 90 weight %, based on the total weight of the aqueous pigment-based ink.

The pH of each aqueous pigment-based ink can be adjusted if desired to at least 8 and up to and including 12, or more likely of at least 8 and up to and including 10, or in some embodiments of at least 8 and up to and including 9.5. The pH can be achieved using any suitable base such as a hydroxide or an organic amine in a suitable amount. Buffers can be included to maintain the desired pH as would be readily apparent to one skilled in the art, according to Cols. 17-19 of U.S. Pat. No. 8,455,570 (noted above).

The various aqueous pigment-based inks useful according to the present invention can be supplied individually or as components of ink sets that can be designed for use in the same inkjet printing apparatus.

Inkjet Printed Articles

Inkjet printed articles prepared according to the present invention comprise a substrate (as described above) on which a topcoat layer had been formed (as described above), on which at least an aqueous-based inkjet printed image or layer has been disposed by inkjet printing. As noted above, such inkjet printed image or layer can be monochrome (single color) or multi-color, or even colorless, or a colorless image or layer can be formed over a monochrome or multi-color inkjet printed image.

Figure 3:
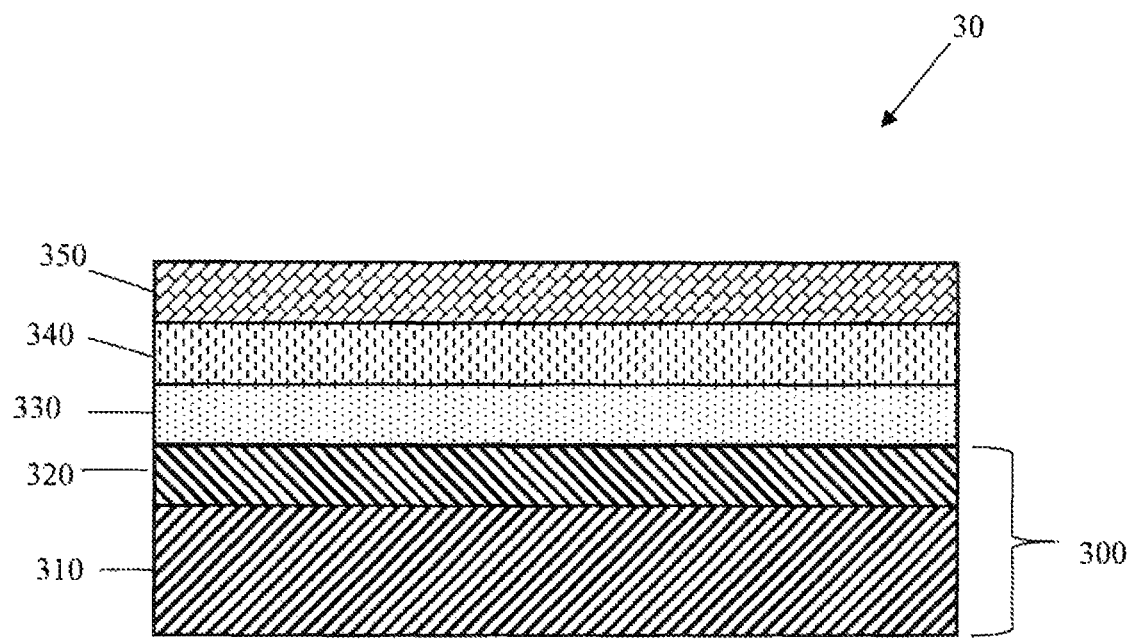
FIG. 3 shows a partial cross-sectional view of an inkjet printed article according to the present invention.

In some embodiments (for example, as illustrated in FIG. 3), inkjet printed article 30 can comprise substrate 300 that is composed of water-impermeable support 310 and first layer 320 disposed thereon (which can have a water-based tie-layer composition); topcoat layer 330 disposed on first layer 320; aqueous-based inkjet printed image or layer 340 disposed on topcoat layer 330, and post-print functional layer 350 disposed on aqueous-based inkjet printed image or layer 340, which post-print functional layer 350 can be an opaque white layer, a transparent protective layer, or an adhesive layer that optionally can have a protective layer adhered thereto.

For example, an opaque white layer can be present to provide desired opacity to the resulting inkjet printed article, particularly when the substrate is transparent or translucent. Any known opaque aqueous-based post-print opacifying layer composition can be used including aqueous-based white flexographic ink compositions sold as Bianco Base 100 by Sun Chemical Corporation and Flint Group Water HMJ 90104. Any commercially available aqueous-based latex paint can be used to provide an opacifying layer such as WB MSQUARED™ aqueous-based white ink from Sun Chemical Corporation which ink comprises a polyurethane latex binder.

A transparent protective layer can be used to protect the inkjet printed article against environmental and physical damage and stress, provide abrasion resistance, resistance to fingerprints, and delamination resistance. Such transparent protective layers can be provided as described in U.S. Patent Application Publication 2018/0051184 (noted above). In addition, known aqueous-based overprint varnishes such as Haut Brilliant 17-604327-7 (Siegwerk) and Micheal Huber Munchen 877801 Varnish Anticurling.

An adhesive layer can be provided to provide adhesion especially in applications such as flexible laminated packaging wherein it is desired to bond a separate film or paper layer to a treated, coated, or printed layer. Useful examples of aqueous-based adhesives useful for such adhesive layers include but are not limited to, Dow Chemical ROBOND™ acrylic adhesives L90M, L0148, and L330 that can be used in combination with a crosslinking agent such as Dow Chemical CR 9-101. Another option is the Dow Chemical AQUALAM™ polyurethane aqueous-based adhesive used in combination with the Dow Chemical CR 7-103 crosslinking agent.

Although the post-print functional layers with specific functions are described separately above, it is also possible to combine two or more functions into a single post-print functional layer. Such combinations are described for example in Col. 18 (lines 24-37) of U.S. Pat. No. 9,376,582 (noted above). In addition, the post-print functional layer descriptions here are intended to be illustrative and not limiting as other post-print functional layers are possible as would be readily apparent to one skilled in the art.

When post-print functional layer 350 is present and aqueous-based, it can be applied or formed using any of the methods described above for applying or forming first layer 320 and topcoat layer 330, including known coating and digital deposition processes. For example, post-print functional layer 350 can be applied as a flood coating across the entire surface of the treated, coated, and inkjet printed article, or it can be applied in a pattern-wise or image-wise fashion. If post-print functional layer 350 is solvent-free, it can be applied using a melt extrusion process wherein the molten or viscous solventless composition is extruded as a continuous layer over the surface of the dried aqueous-based inkjet printed image or layer 340. Following melt-extrusion, post-print functional layer 350 can be further processed using heat and pressure to improve adhesion, followed by cooling. In some embodiments, a solventless composition can be a two-part reactive composition intended to serve as an adhesive to which a continuous protective post-print functional layer is laminated using heat or pressure.

In some other embodiments, the inkjet printed article according to the present invention is simpler in structure (not shown) compared to that illustrated in FIG. 3. In such embodiments, aqueous-based inkjet printed image or layer 340 is disposed directly on the topcoat layer 330. Thus, first layer 320 is omitted. Post-print functional layer 350 can be present or omitted from such embodiments.

Other useful embodiments of inkjet receiving media and resulting inkjet printed articles can be conceived of by a skilled artisan using the present teaching.

The present invention provides at least the following embodiments and combinations thereof, but other combinations of features are considered to be within the present invention as a skilled artisan would appreciate from the teaching of this disclosure:

1. An inkjet receiving medium comprising a substrate and a topcoat layer disposed thereon, which topcoat layer comprises:

(a) one or more water-soluble salts of a multivalent metal cation; and (b) composite particles having a Rockwell Hardness of less than or equal to R90 and each of the composite particles comprising domains of a (i) first organic polymer and domains of a (ii) second organic polymer, wherein:

the domains of the (ii) second organic polymer are dispersed within the domains of the (i) first organic polymer;

the melting point of the (i) first organic polymer is lower than the melting point of the (ii) second organic polymer; and the weight ratio of the (i) first polymer to the (ii) second polymer is chosen such that the (b) composite particles have a density of at least 1.0 g/ml and up to and including 1.5 g/ml.

2. The inkjet receiving medium of embodiment 1, wherein the (b) composite particles have a density of at least 1.05 g/ml and up to and including 1.35 g/ml.

3. The inkjet receiving medium of embodiment 1 or 2, wherein the (b) composite particles have a Rockwell Hardness of less than or equal to R75.

4. The inkjet receiving medium of any of embodiments 1 to 3, wherein the (b) composite particles have an average equivalent spherical diameter (ESD) particle size of at least 2 μm and up to and including 12 μm.

5. The inkjet receiving medium of any of embodiments 1 to 4, wherein the (b) composite particles comprise domains of a (ii) second organic polymer that comprises poly(tetrafluoroethylene) and domains of a (i) first organic polymer that is a polyethylene, polypropylene, ethylene bi-stearamide, carnauba wax, a synthetic hydrocarbon wax, a polyamide, an ethylene-propylene copolymer, or a combination of two or more of these materials.

6. The inkjet receiving medium of any of embodiments 1 to 5, wherein the substrate comprises a hydrophobic surface prior to the topcoat layer being formed thereon, which hydrophobic surface is impermeable to water or an aqueous ink composition, and which topcoat layer provides a hydrophilic surface relative to the hydrophobic surface of the substrate.

7. The inkjet receiving medium of embodiment 6, wherein the topcoat layer further comprises a (c) water-soluble or water-dispersible binder material that is a polyvinyl alcohol, polyethylene oxide, polyvinyl amine, a copolymer derived from vinyl alcohol and ethylene oxide, a copolymer derived from vinyl alcohol and a vinyl amine, poly(vinyl pyrrolidone), cellulose or a derivative thereof, gelatin or derivative thereof, a crosslinkable hydrophilic binder polymer, a cationic polyelectrolyte, a polyurethane, or a silanol-modified poly(vinyl alcohol), all of which are different in chemical composition from the (b) composite particles.

8. The inkjet receiving medium of embodiment 7, wherein the (c) water-soluble or water-dispersible binder material is present in the topcoat layer at a dry weight of at least 1% and up to and including 69%, based on the total weight of the topcoat layer.

9. The inkjet receiving medium of any of embodiments 1, wherein the topcoat layer further comprises (d) organic or inorganic particles that are different from the (a) one or more water-soluble salts of a multivalent metal cation and from the (b) composite particles.

10. The inkjet receiving medium of embodiment 9, wherein the (d) organic or inorganic particles comprise silica.

11. The inkjet receiving medium of any of embodiments 1 to 10, wherein the (a) one or more water-soluble salts of a multivalent metal cation comprises a cation that is magnesium (+2), calcium (+2), barium (+2), zinc (+2), or aluminum (+3).

12. The inkjet receiving medium of any of embodiments 1 to 11, wherein the (a) one or more water-soluble salts of a multivalent metal cation comprise one or more of $CaCl_2$, $Ca(CH_3CO_2)_2$, $MgCl_2$, $Mg(CH_3CO_2)_2$, $Ca(NO_3)_2$, or $Mg(NO_3)_2$, or hydrated versions of these salts.

13. The inkjet receiving medium of any of embodiments 1 to 12, wherein the topcoat layer has a dry solids coating weight of at least 0.1 $g/m^2$ and up to and including 10 $g/m^2$.

14. The inkjet receiving medium of any of embodiments 1 to 13, wherein the (a) one or more water-soluble salts of a multivalent metal cation are present in the topcoat layer in an amount of at least 10 weight % and up to and including 98 weight %.

15. The inkjet receiving medium of any of embodiments 1 to 14, wherein the (b) composite particles are present in the topcoat layer in an amount of at least 0.2 weight % and up to and including 30 weight %.

16. The inkjet receiving medium of any of embodiments 1 to 15, wherein the substrate is capable of absorbing and transferring an aqueous ink colorant to the substrate interior prior to the topcoat layer being formed thereon.

17. The inkjet receiving medium of any of embodiments 1 to 16, wherein the (b) composite particles have a Rockwell Hardness of less than or equal to R75 and are present in the topcoat layer in a dry coating weight of at least 0.01 $g/m^2$ and up to and including 1 $g/m^2$.

18. The inkjet receiving medium of any of embodiments 1 to 15 and 17, wherein the substrate comprises a water-impermeable support, and a first layer that is disposed on at least one surface of the water-impermeable support and is underneath the topcoat layer.

19. The inkjet receiving medium of embodiment 18, wherein the water-impermeable support comprises a polymeric film, or a co-extrudate or a laminate of two or more polymeric films.

20. The inkjet receiving medium of embodiment 18 or 19, wherein the first layer comprises a polyvinyl alcohol, polyvinyl amine, a copolymer derived from vinyl alcohol and a vinyl amine, a gelatin or gelatin derivative, poly(ethyleneimine), an epoxy resin, a polyurethane, a polyacrylamide or a derivative or copolymer thereof, or mixtures thereof.

21. The inkjet receiving medium of any of embodiments 18 to 20, wherein the first layer comprises a first sub-layer and a second sub-layer, the first sub-layer comprising poly(ethyleneimine) and an epoxy resin modified with an acidified aminoethylated vinyl polymer, and the second sub-layer that is disposed on the first sub-layer comprises a crosslinked polyvinyl alcohol.

22. The inkjet receiving medium of any of embodiments 1 to 21, wherein the substrate is a coated offset paper.

The following Examples are provided to illustrate the practice of this invention and are not meant to be limiting in any manner.

Wax Dispersion Preparation:

Wax dispersions of various dry powder waxes (obtained from Micro Powders, Inc.) were prepared using MICROSPERSION® EZ surfactant (proprietary to Micro Powders, Inc.) and AIRASE® 4655 defoamer (Evonik Corporation).

Each dry powder wax was first dispersed into water to make a 25 weight % dispersion according to Formulation 1 shown below. The dry power wax dispersion was then added slowly to the other components using a low turbulence disk stirrer set at 2200 rpm over 30 minutes. The resulting wax dispersion was then mixed using a high shear rotostator at 5500 rpm for 20 minutes, achieving a tip speed of 8.6 m/sec.

Formulation 1:
43.65 g of distilled water;
1.20 g of MICROSPERSION® EZ surfactant;
0.15 g of AIRASE® 4655 defoamer; and
15.00 g of the dry powder wax.

The prepared wax dispersions are described in the following TABLE I. In the case of Control Sample 1.11 that contained no wax, the amount of dry powder wax in the noted Formulation 1 was replaced with an equal mass of distilled water.

TABLE I

| Sample | Dry Powder Wax Used | Type of Wax | Density of Wax (g/ml) |
|---|---|---|---|
| 1.1 (Comparative) | MP-22XF | Synthetic | 0.94 |
| 1.2 (Comparative) | MPP-615XF | PE | 0.95 |
| 1.3 (Comparative) | POLYFLUO ® 190 | PE/PTFE composite | 0.99 |
| 1.4 (Comparative) | POLYFLUO ® 535 | PE/PTFE composite | 1.02 |
| 1.5 (Inventive) | POLYFLUO ® 302 | PE/PTFE composite | 1.05 |
| 1.6 (Inventive) | POLYFLUO ® 120 | PE/PTFE composite | 1.10 |
| 1.7 (Inventive) | POLYFLUO ® 150 | PE/PTFE composite | 1.15 |
| 1.8 (Inventive) | POLYFLUO ® 400 | PE/PTFE composite | 1.35 |
| 1.9 (Inventive) | POLYFLUO ® 523AL | PE/PTFE/$Al_2O_3$ | 1.09 |
| 1.10 (Comparative) | FLUO ® X-1406 | PTFE | 2.20 |
| 1.11 (Control) | None | | N/A |

PE = polyethylene
PTFE = polytetrafluoroethylene (Teflon)

Preparation of Aqueous Compositions:

For preparing aqueous compositions shown below in TABLE II, the following components were used with the various Samples of TABLE I: poly(vinyl alcohol) (PVA) Z-320 polymer (Nippon Gohsei); anhydrous calcium chloride (Occidental Chemical Corporation; CARBOWET® 106 and SURFYNOL® 104PA (Evonik Industries AG).

Each aqueous composition was prepared according to Formulation 2 described below (100 g total). Mixing was accomplished with magnetic stir bars on a hot plate. Distilled water and PVA Z-320 polymer were first mixed at room temperature, and then heated to 80° C. for 1 hour to dissolve the PVA. The temperature was then reduced to 50° C. at which time the calcium chloride was added and mixed for 15 minutes. The temperature was reduced to room temperature, where the various Samples of TABLE I were added and stirred for 1 hour. CARBOWET® 106 was added and mixed for 15 minutes, and then SURFYNOL® 104PA was added and mixed for an additional 30 minutes.

In the case of Aqueous Compositions 2.12 and 2.13, two wax dispersion Samples A and B were added instead of a single Sample at the percentages indicated in TABLE II. All the aqueous compositions contained the same total weight of dispersed wax particles except for Composition 2.11 that contained no wax with the use of Sample 1.11. The surface tension of each aqueous composition was measured, and all of them were found to be within 0.2 dyne/cm of the mean surface tension. Differences in viscosity were also minimal, within the resolution of the measurement.

Formulation 2:
84.68 g of distilled water;
3.72 g of PVA Z-320;
8.27 g of anhydrous calcium chloride;
2.89 g Sample from TABLE I;
0.15 g of CARBOWET® 106 surfactant; and
0.30 g of SURFYNOL® 104PA defoamer.

TABLE II

| Aqueous Composition | Sample A (from TABLE I) | Sample A % | Sample B (from TABLE I) | Sample B % |
|---|---|---|---|---|
| 2.1 (Comparative) | 1.1 | 100 | none | 0 |
| 2.2 (Comparative) | 1.2 | 100 | none | 0 |
| 2.3 (Comparative) | 1.3 | 100 | none | 0 |
| 2.4 (Comparative) | 1.4 | 100 | none | 0 |
| 2.5 (Inventive) | 1.5 | 100 | none | 0 |
| 2.6 (Inventive) | 1.6 | 100 | none | 0 |
| 2.7 (Inventive) | 1.7 | 100 | none | 0 |
| 2.8 (Inventive) | 1.8 | 100 | none | 0 |
| 2.9 (Inventive) | 1.9 | 100 | none | 0 |
| 2.10 (Comparative) | 1.10 | 100 | none | 0 |
| 2.11 (Comparative) | 1.11 | 100 | none | 0 |
| 2.12 (Comparative) | 1.2 | 88 | 1.10 | 12 |
| 2.13 (Comparative) | 1.2 | 68 | 1.10 | 32 |

Evaluation of Aqueous Compositions for Inkjet Printing Performance:

Each of the aqueous compositions shown in TABLE II were coated onto Kemiart Graph paper as a substrate using a lab-scale reverse-gravure coating machine, to provide topcoat layers in inkjet receiving media, the topcoat layers having a dry laydown of about 0.5 g/m². Samples of the resulting inkjet receiving media were inkjet printed using a KODAK® Prosper continuous inkjet pilot printer. Step wedge images were measured with a Spectrolino densitometer, and the maximum density achieved ($D_{max}$) for the inkjet printed black and cyan primary colors are reported below in TABLE III. In addition, the inkjet printed cyan images were analyzed using a PIAS-II device manufactured by Quality Engineering Associates. Graininess was measured with a 37 μm tile size and mottle was measured using a 411-tile size. In both cases, the maximum reading in the CIELAB luminance (brightness) channel (L*) is also reported in TABLE III.

The data in TABLE III show that all the aqueous compositions and resulting topcoat layers performed similarly for density and image quality because all of them contained the same amount of calcium chloride and PVA that dominates the immobilization of the pigments in the inks when they impact the paper substrate. The last row in TABLE III represents printed images made without any aqueous composition applied to the paper substrate, and the results clearly show degraded performance relative to inkjet printed images made when the paper substrate was pretreated with an aqueous composition to form a topcoat layer.

TABLE III

| Inkjet Printed Sample | Aqueous Composition | Black image $D_{max}$ | Cyan image $D_{max}$ | Cyan L* Graininess | Cyan L* Mottle |
|---|---|---|---|---|---|
| 3.1 (Comparative) | 2.1 | 1.80 | 1.63 | 4.0 | 0.7 |
| 3.2 (Comparative) | 2.2 | 1.84 | 1.64 | 4.0 | 0.7 |
| 3.3 (Comparative) | 2.3 | 1.88 | 1.68 | 4.0 | 0.7 |
| 3.4 (Comparative) | 2.4 | 1.84 | 1.64 | 4.0 | 0.8 |
| 3.5 (Inventive) | 2.5 | 1.85 | 1.65 | 4.1 | 0.8 |
| 3.6 (Inventive) | 2.6 | 1.82 | 1.64 | 4.0 | 0.7 |
| 3.7 (Inventive) | 2.7 | 1.82 | 1.63 | 4.0 | 0.7 |
| 3.8 (Inventive) | 2.8 | 1.86 | 1.67 | 4.1 | 0.7 |
| 3.9 (Inventive) | 2.9 | 1.86 | 1.65 | 4.0 | 0.7 |
| 3.10 (Comparative) | 2.10 | 1.90 | 1.67 | 4.1 | 0.7 |
| 3.11 (Comparative) | 2.11 | 1.91 | 1.70 | 4.0 | 0.7 |
| 3.12 (Comparative) | 2.12 | 1.83 | 1.65 | 4.1 | 0.7 |
| 3.13 (Comparative) | 2.13 | 1.87 | 1.65 | 4.0 | 0.7 |
| 3.14 (Comparative) | None | 1.73 | 1.31 | 2.8 | 1.8 |

Dry Rub Performance of Aqueous Compositions on Kemiart Graph Paper:

Images were inkjet printed as described above to evaluate the aqueous compositions and resulting topcoat layers for dry rub resistance. Six of the test patches included aqueous-based black pigment ink printed at 100% of maximum ink coverage over aqueous-based yellow, cyan, and magenta primary colors as well as over red, green, and blue secondary colors. Each of the underlying colors were printed at 100% of maximum ink coverage. Each of the patches was rubbed with a 2"×4" (5 cm×10 cm) piece of bond paper beneath a 4-lb$_m$ (1.82 kg) weight for 10 back and forth cycles using a Sutherland rub tester. Dry rub resistance was characterized by measuring the % density change in each of the 12 abraded patches and then averaged over all patches. Numbers closer to zero represent better dry rub performance. Due to measurement noise, some of the patches might register a small positive density change. In most cases, the abrasion of ink caused a density loss that is indicated with a negative density change in the following TABLE IV.

These results show that all the samples except for Sample 4.10 had good dry rub resistance (density change of less than 1%). Sample 4.11, containing no wax, demonstrated poor dry rub performance and the results were approximately equal to those of Sample 4.14, for which printing was performed on the paper support without a topcoat layer. Sample 4.10 exhibited an intermediate level of dry rub resistance, and that was likely due to the high density of the wax particles used in the topcoat layer. Since all the aqueous compositions containing wax particles contained an equal mass of wax, the aqueous composition used for Sample 4.10 would necessarily contain a fewer number of wax particles.

TABLE IV

| Sample | Aqueous Composition | Weighted Wax Rockwell Hardness | Dry Rub % Density Change |
|---|---|---|---|
| 4.1 (Comparative) | 2.1 | 55.0 | 0.4 |
| 4.2 (Comparative) | 2.2 | 55.0 | −0.1 |
| 4.3 (Comparative) | 2.3 | 55.1 | −1.0 |
| 4.4 (Comparative) | 2.4 | 55.2 | 0.6 |
| 4.5 (Inventive) | 2.5 | 55.2 | 0.2 |
| 4.6 (Inventive) | 2.6 | 55.4 | 0.2 |
| 4.7 (Inventive) | 2.7 | 55.5 | 0.5 |
| 4.8 (Inventive) | 2.8 | 56.0 | 0.4 |
| 4.9 (Inventive) | 2.9 | 55.3 | 0.8 |
| 4.10 (Comparative) | 2.10 | 58.0 | −2.2 |
| 4.11 (Comparative) | 2.11 | Not applicable | −6.9 |
| 4.12 (Comparative) | 2.12 | 55.4 | 0.4 |
| 4.13 (Comparative) | 2.13 | 56.0 | 0.3 |
| 4.14 (Comparative) | None | Not applicable | −8.5 |

Settling Performance of Coating Fluids:

The aqueous compositions described above were evaluated for settling by a centrifugation method to accelerate the settling that would occur over longer periods of time under the influence of gravity. Wax particles are expected to either float, sink, or be neutrally buoyant in an aqueous composition. The coating fluid density, because of the dissolved water-soluble salt of a multivalent cation, was denser than water and measured to be 1.06 g/ml.

The accelerated settling was performed in a centrifuge having a half-tube spinning radius of 12.8 cm for 30 minutes at 830 rpm. The results are summarized in the following TABLE V. Surface solids that are listed as "structured" caused higher viscosity and resisted mixing due to the integrity of the layer like a floating foam. Surface solids that were observed to be "fluid" provided lower viscosity and easily mixed into the underlying fluid with minimal agitation. Bottom solids described as "soft" were loose and easily fluidized by agitation. Bottom solids listed as "dense" stuck to the tube and resisted dispersal even with severe agitation. Solution turbidity was used to describe the solids that were still suspended in the aqueous composition. Those samples listed as "stratified" had regions near the bottom of the tube that were clear (less turbid) than the remainder of the fluid in the tube. The data in TABLE V clearly show the advantage of the aqueous compositions designed according to the present invention. These aqueous compositions contained waxes having a density that is similar or slightly higher than the density of the base fluid (containing mostly water), and both the floating particles and sinking particles were easily re-dispersed upon gentle agitation. Comparative aqueous compositions contained waxes and mixtures of waxes (Samples 5.12 and 5.13) and exhibited either a structured floating foam, a densely packed sinking solid, or both.

TABLE V

| Sample | Aqueous Composition | Weighted Wax density (g/ml) | Surface Solids | Bottom Solids | Solution Turbidity |
|---|---|---|---|---|---|
| 5.1 (Comparative) | 2.1 | 0.94 | structured | None | Stratified |
| 5.2 (Comparative) | 2.2 | 0.95 | structured | None | Stratified |
| 5.3 (Comparative) | 2.3 | 0.99 | structured | None | Stratified |
| 5.4 (Comparative) | 2.4 | 1.02 | structured | Soft | Stratified |
| 5.5 (Inventive) | 2.5 | 1.05 | fluid | Soft | Uniform |
| 5.6 (Inventive) | 2.6 | 1.10 | fluid | Soft | Uniform |
| 5.7 (Inventive) | 2.7 | 1.15 | fluid | Soft | Uniform |
| 5.8 (Inventive) | 2.8 | 1.35 | fluid | Soft | Uniform |
| 5.9 (Inventive) | 2.9 | 1.09 | fluid | Soft | Uniform |
| 5.10 (Comparative) | 2.10 | 2.20 | none | Dense | Stratified |
| 5.11 (Comparative) | 2.11 | Not applicable | None | None | Low |
| 5.12 (Comparative) | 2.12 | 1.10 | Structured | Dense | Stratified |
| 5.13 (Comparative | 2.13 | 1.35 | Structured | Dense | Stratified |

Particle Size of Dispersions:

Particle size distributions were obtained using a Horiba Particle Size Distribution Analyzer LA-920 (Horiba Semiconductor) that utilizes a static light technique to produce a volume weighted distribution. Each particle sample was diluted with ultrapure water to yield an appropriate amount of light scatter within the limits displayed by the instrument indictors. Each resulting dispersion sample was analyzed with low level sonication within the instrument to minimize any aggregation that might exist. Results are reported in the following TABLE VI as "determined" median (or mean) particle size or manufacturer particle size wherein the particle size is defined in terms of an equivalent spherical diameter (or ESD) in μm. Sample 6.11, despite having no wax, contained particles that consisted of an emulsion of the MICROSPERSION® EZ surfactant (proprietary to Micro Powders, Inc.) and AIRASE® 4655 defoamer (Evonik Corporation) in water. As noted above, the dry powders used in these dispersions were obtained from Micro Powders, Inc.

TABLE VI

| Dispersion | Dry Wax Used | Determined Median ESD (μm) | Manufacturer ESD (μm) |
|---|---|---|---|
| 6.1 (Comparative) | MP-22XF | 8.2 | 5.5 |
| 6.2 (Comparative) | MPP-615XF | 6.6 | 5.5 |
| 6.3 (Comparative) | POLYFLUO® 190 | 11.6 | 10.5 |
| 6.4 (Comparative) | POLYFLUO® 535 | 7.0 | 5.5 |
| 6.5 (Inventive) | POLYFLUO® 302 | 8.0 | 5.5 |
| 6.6 (Inventive) | POLYFLUO® 120 | 5.2 | 8.0 |
| 6.7 (Inventive) | POLYFLUO® 150 | 4.3 | 4.5 |
| 6.8 (Inventive) | POLYFLUO® 400 | 6.5 | 5.5 |

TABLE VI-continued

| Dispersion | Dry Wax Used | Determined Median ESD (μm) | Manufacturer ESD (μm) |
|---|---|---|---|
| 6.9 (Inventive) | POLYFLUO® 523AL | 8.0 | 4.5 |
| 6.10 (Comparative) | FLUO® X-1406 | 7.5 | 5.0 |
| 6.11 (Comparative) | None | 4.0 | N/A |

The invention has been described in detail with particular reference to certain preferred embodiments thereof, but it will be understood that variations and modifications can be achieved within the spirit and scope of the invention.

PARTS LIST 10 inkjet receiving medium
20 inkjet recording medium
30 inkjet printed article
100 substrate
110 topcoat layer
200 support
210 first layer
215 substrate
220 topcoat layer
300 substrate
310 water-impermeable support
320 first layer
330 topcoat layer
340 aqueous-based inkjet printed image or layer
350 post-print functional layer

The invention claimed is:

1. An inkjet receiving medium comprising a substrate and a topcoat layer disposed thereon, which topcoat layer comprises:
   (a) one or more water-soluble salts of a multivalent metal cation; and
   (b) composite particles having a Rockwell Hardness of less than or equal to R90 and each of the composite particles comprising domains of a (i) first organic polymer and domains of a (ii) second organic polymer, wherein:
   the domains of the (ii) second organic polymer are dispersed within the domains of the (i) first organic polymer;
   the melting point of the (i) first organic polymer is lower than the melting point of the (ii) second organic polymer; and
   the weight ratio of the (i) first organic polymer to the (ii) second organic polymer is chosen such that the (b) composite particles have a density of at least 1.0 g/ml and up to and including 1.5 g/ml.

2. The inkjet receiving medium of claim 1, wherein the (b) composite particles have a density of at least 1.05 g/ml and up to and including 1.35 g/ml.

3. The inkjet receiving medium of claim 1, wherein the (b) composite particles have a Rockwell Hardness of less than or equal to R75.

4. The inkjet receiving medium of claim 1, wherein the (b) composite particles have an average equivalent spherical diameter (ESD) particle size of at least 2 μm and up to and including 12 μm.

5. The inkjet receiving medium of claim 1, wherein the (b) composite particles comprise domains of a (ii) second organic polymer that comprises poly(tetrafluoroethylene) and domains of a (i) first organic polymer that is a polyethylene, polypropylene, ethylene bi-stearamide, carnauba wax, a synthetic hydrocarbon wax, a polyamide, an ethylene-propylene copolymer, or a combination of two or more of these materials.

6. The inkjet receiving medium of claim 1, wherein the substrate comprises a hydrophobic surface prior to the topcoat layer being formed thereon, which hydrophobic surface is impermeable to water or an aqueous ink composition, and which topcoat layer provides a hydrophilic surface relative to the hydrophobic surface of the substrate.

7. The inkjet receiving medium of claim 6, wherein the topcoat layer further comprises a (c) water-soluble or water-dispersible binder material that is a polyvinyl alcohol, polyethylene oxide, polyvinyl amine, a copolymer derived from vinyl alcohol and ethylene oxide, a copolymer derived from vinyl alcohol and a vinyl amine, poly(vinyl pyrrolidone), cellulose or a derivative thereof, gelatin or derivative thereof, a crosslinkable hydrophilic binder polymer, a cationic polyelectrolyte, a polyurethane, or a silanol-modified poly(vinyl alcohol), all of which are different in chemical composition from the (b) composite particles.

8. The inkjet receiving medium of claim 7, wherein the (c) water-soluble or water-dispersible binder material is present in the topcoat layer at a dry weight of at least 1% and up to and including 69%, based on the total weight of the topcoat layer.

9. The inkjet receiving medium of claim 1, wherein the topcoat layer further comprises (d) organic or inorganic particles that are different from the (a) one or more water-soluble salts of a multivalent metal cation and from the (b) composite particles.

10. The inkjet receiving medium of claim 9, wherein the (d) organic or inorganic particles comprise silica.

11. The inkjet receiving medium of claim 1, wherein the (a) one or more water-soluble salts of a multivalent metal cation comprises a cation that is magnesium (+2), calcium (+2), barium (+2), zinc (+2), or aluminum (+3).

12. The inkjet receiving medium of claim 1, wherein the (a) one or more water-soluble salts of a multivalent metal cation comprise one or more of $CaCl_2$, $Ca(CH_3CO_2)_2$, $MgCl_2$, $Mg(CH_3CO_2)_2$, $Ca(NO_3)_2$, or $Mg(NO_3)_2$, or hydrated versions of these salts.

13. The inkjet receiving medium of claim 1, wherein the topcoat layer has a dry solids coating weight of at least 0.1 $g/m^2$ and up to and including 10 $g/m^2$.

14. The inkjet receiving medium of claim 1, wherein the (a) one or more water-soluble salts of a multivalent metal cation are present in the topcoat layer in an amount of at least 10 weight % and up to and including 98 weight %.

15. The inkjet receiving medium of claim 1, wherein the (b) composite particles are present in the topcoat layer in an amount of at least 0.2 weight % and up to and including 30 weight %.

16. The inkjet receiving medium of claim 1, wherein the substrate is capable of absorbing and transferring an aqueous ink colorant to the substrate interior prior to the topcoat layer being formed thereon.

17. The inkjet receiving medium of claim 1, wherein the (b) composite particles have a Rockwell Hardness of less than or equal to R75 and are present in the topcoat layer in a dry coating weight of at least 0.01 $g/m^2$ and up to and including 1 $g/m^2$.

18. The inkjet receiving medium of claim 1, wherein the substrate comprises a water-impermeable support, and a first layer that is disposed on at least one surface of the water-impermeable support and is underneath the topcoat layer.

19. The inkjet receiving medium of claim 18, wherein the water-impermeable support comprises a polymeric film, or a co-extrudate or a laminate of two or more polymeric films.

20. The inkjet receiving medium of claim 18, wherein the first layer comprises a polyvinyl alcohol, polyvinyl amine, a copolymer derived from vinyl alcohol and a vinyl amine, a gelatin or gelatin derivative, poly(ethyleneimine), an epoxy resin, a polyurethane, a polyacrylamide or a derivative or copolymer thereof, or mixtures thereof.

* * * * *